US006060803A

United States Patent [19]

Hisamoto et al.

[11] Patent Number: 6,060,803

[45] Date of Patent: May 9, 2000

[54] STARTER WITH MULTIPLE LEVER SPRINGS

[75] Inventors: Motoi Hisamoto; Shigeru Shiroyama, both of Tokyo, Japan

[73] Assignee: Mitsubishi Denki Kabushiki Kaisha, Tokyo, Japan

[21] Appl. No.: 09/224,944

[22] Filed: Jan. 4, 1999

[30] Foreign Application Priority Data

Aug. 20, 1998 [JP] Japan .................................. 10-234495

[51] Int. Cl.$^{7}$ .............................. H02K 7/10; F02N 11/00; F02N 1/00; G05G 5/06

[52] U.S. Cl. ................................ 310/78; 310/41; 310/80; 290/38 R; 290/38 A; 74/532; 74/527; 74/529; 74/537; 123/185.1

[58] Field of Search ................................ 290/38 R, 38 A; 74/527, 529, 532, 537, 6, 7 A; 310/78, 41, 80; 123/185.1

[56] References Cited

U.S. PATENT DOCUMENTS

| | | | |
|---|---|---|---|
| 1,598,810 | 9/1926 | Elsey | 290/38 R |
| 2,960,879 | 11/1960 | Lafitte | 74/6 |
| 3,820,406 | 6/1974 | Toulier | 74/6 |
| 4,929,857 | 5/1990 | Isozumi | 310/83 |
| 5,012,686 | 5/1991 | Morishita et al. | 74/7 A |

FOREIGN PATENT DOCUMENTS 57-145767 3/1956 Japan .

*Primary Examiner*—Nestor Ramirez
*Assistant Examiner*—Guillermo Perez
*Attorney, Agent, or Firm*—Sughrue, Mion, Zinn, Macpeak & Seas, PLLC

[57] ABSTRACT

A starter comprising: a motor 24, a clutch 21, which is connected to the motor 24; a pinion gear 22, which is connected to the clutch 21 and engages and disengages with the ring gear of the engine; an electromagnetic switch 2, which switches on and off an electric current for the motor 24; a reciprocating shift lever 4, which is linked to the electromagnetic switch 2; and lever springs 105, which press the shift lever 4 so that the pinion gear 22 is elastically pushed against and engaged with the ring gear; wherein the lever springs 105 are arranged symmetrically with respect to a plane 25 which includes the central axis of the motor 24 and the central axis of the electromagnetic switch 2, the lever springs 105 are attached to cylindrical portions **106*b* which are a plurality of protrusions on the plate 106, and the lever springs 105 and the shift lever 4 come into contact through a plate 106**.

4 Claims, 3 Drawing Sheets

STARTER WITH MULTIPLE LEVER SPRINGS

BACKGROUND OF THE INVENTION

1. Field of the Invention

The present invention relates to an electromagnetic push-in starter, and especially to a starter which elastically pushes a pinion gear against the ring gear of an engine by means of a reciprocating shift lever which is linked to an electromagnetic switch.

2. Description of the Related Art

FIGS. 5 and 6 show the construction of a conventional starter. FIG. 5 is a cross-sectional view of the starter. FIG. 6 is a cross-sectional view along line 6—6 in FIG. 5. In FIG. 5, an electromagnetic switch 2 is mounted on a starter front bracket 1. The electromagnetic switch 2 ha a movable core 3 and a hook portion 3*a* is disposed at the leading end of the movable core, which is the end closest to the front bracket 1. A cam portion 4*a* of a shift lever 4 is engaged with the hook portion 3*a*. A cylindrical portion 4*d* is disposed in the central region of the shift lever 4. Another cam portion 4*c* is disposed at the end of the shift lever 4 opposite to the cam portion 4*a,* and is engaged with a clutch 21, which is connected to a pinion gear 22, and the cam portion 4*c* moves the clutch 21 in the direction of P whereby the pinion gear 22 is elastically pushed against and engaged with the ring gear of an engine (not shown).

In FIG. 6, a cylindrical portion 4*d* of the shift lever 4 is supported by a support wall 1*a* disposed in the front bracket 1, and is held between a disk-shaped plate 6 and the front bracket 1 by the elastic force of a lever spring 5, which is a coil spring.

In FIG. 5, the shift lever 4 is able to reciprocate around the cylindrical portion 4*d* or around the cam portion 4*c*. The lever spring 5 is supported by a yoke 7 by means of a plate 9 and a grommet 8.

A case 10 of magnetic material is disposed in the electromagnetic switch 2, and a bush 23 is inserted in an inner circumferential surface 10*b* of the end thereof, and is disposed such that the movable core 3 can slide along the inner circumferential surface of the bush 23 in the direction of P or Q. A pressure-bearing surface 3*c* for a spring 11, which is a coil spring for returning the movable core 3, is formed in a trailing end 3*b* of the movable core 3, which is the opposite end to the leading end where the hook portion 3*a* is disposed.

A fixed core 13, which form part of a magnetic circuit, is inserted into and secured to a socket joint portion 10*a* of the case 10. A movable contact shaft 12 is slidably supported by a round hole portion 13*a* of the fixed core 13. A solenoid 14, comprising an electromagnetic coil 16 wound around a bobbin 15, is disposed on the side of the fixed core 13 closest to the front bracket 1.

When a current is passed through the solenoid 14 by passing a current through a key switch (not shown), a magnetic circuit is formed which includes the movable core 3, the case 10, the fixed core 13, an air gap portion 17, and the movable core 3 is attracted towards the fixed core 13 and moves in the direction of Q. Accompanying this motion, the shift lever 4 rotates counterclockwise around the cylindrical portion 4*d,* and the cam portion 4*c* of the shift lever 4 pushes the clutch 21 which in turn elastically pushes the pinion gear 22 against the ring gear of an engine (not shown) to engage the pinion gear 22 with the ring gear, and at the same time the movable contact shaft 12 is pressed in the direction of Q, closing a contact circuit (not shown), and a motor 24 turns.

However, if the pinion gear 22 fails to engage with the ring gear of the engine and the counterclockwise motion of the shift lever 4 is obstructed as the movable core 3 is attracted toward the fixed core 13 and moves in the direction of Q, the shift lever 4 rotates counterclockwise around the cam portion 4*c,* the cylindrical portion 4*d* of the shift lever 4 moves in the direction of Q and presses again the lever spring 5 through the plate 6, and the lever spring 5 is compressed. The movable core 3 and the fixed core 13 come into contact and the movable contact shaft 12 is pressed, closing the contact circuit (not shown), and the motor 24 turns.

Because the conventional electromagnetic push-in starter is constructed in the above manner, when the pinion gear 22 and the ring gear of the engine fail to engage and the pinion gear is unable to move in the direction of P and stops, the shift lever 4 rotates counterclockwise around the cam 4*c* to ensure that the movable core 3 can move to press against the movable contact shaft 12. At this time, the cylindrical portion 4*d* of the shift lever 4 moves in the direction of Q and presses against the lever spring 5 through the plate 6. When the movable contact shaft 12 is pressed and the contact circuit (not shown) is closed and the motor 24 turns, the spring load in the lever spring 5 becomes the pushing force for the shift lever 4 which elastically pushes the pinion gear against the ring gear of the engine. Engagement of the pinion gear 22 in the ring gear is facilitated by this force.

The size of the starter, that is, the diameter of the motor 24 or the electromagnetic switch 2, can be reduced by a construction which decreases the center distance, which is the distance between the central axis 24*a* of the motor 24 and the central axis 2*a* of the electromagnetic switch 2. In order to decrease this distance, it is necessary to reduce the outside diameter of the lever spring 5. However, merely reducing the outside diameter of the lever spring 5 increases the stress on the lever spring 5, and there is a limit to the amount of reduction the outside diameter of the lever spring 5 can tolerate. Also, the load of the lever spring 5 pushing on the shift lever 4 is required to press the pinion gear 22 against the ring gear and cannot be decreased.

SUMMARY OF THE INVENTION

The present invention aims to solve the above problems and an object of the present invention is to provide a compact starter in which the size of the starter is reduced by reducing the center distance between the motor and the electromagnetic switch by reducing the outer diameter of the lever spring while ensuring the strength of the lever spring without decreasing the load pressing the pinion gear against the ring gear.

The starter according to the present invention comprises: a motor; a clutch, which is connected to the motor; a pinion gear, which is connected to the clutch and engages and disengages with the ring gear of an engine; an electromagnetic switch, which switches on and off an electric current for the motor; a reciprocating shift lever, which is linked to the electromagnetic switch; and lever springs, which press the shift lever so that the pinion gear is elastically pushed against and engaged with the ring gear; wherein the lever springs are arranged symmetrically with respect to a plane which includes the central axis of the motor and the central axis of the electromagnetic switch.

The starter according to the present invention is characterized in that the lever springs and the shift lever may come into contact through a plate.

The starter according to the present invention is characterized in that the lever springs may be attached to a plurality of protrusions on the plate.

DESCRIPTION OF THE PREFERRED EMBODIMENT

Embodiment

Figure 1:
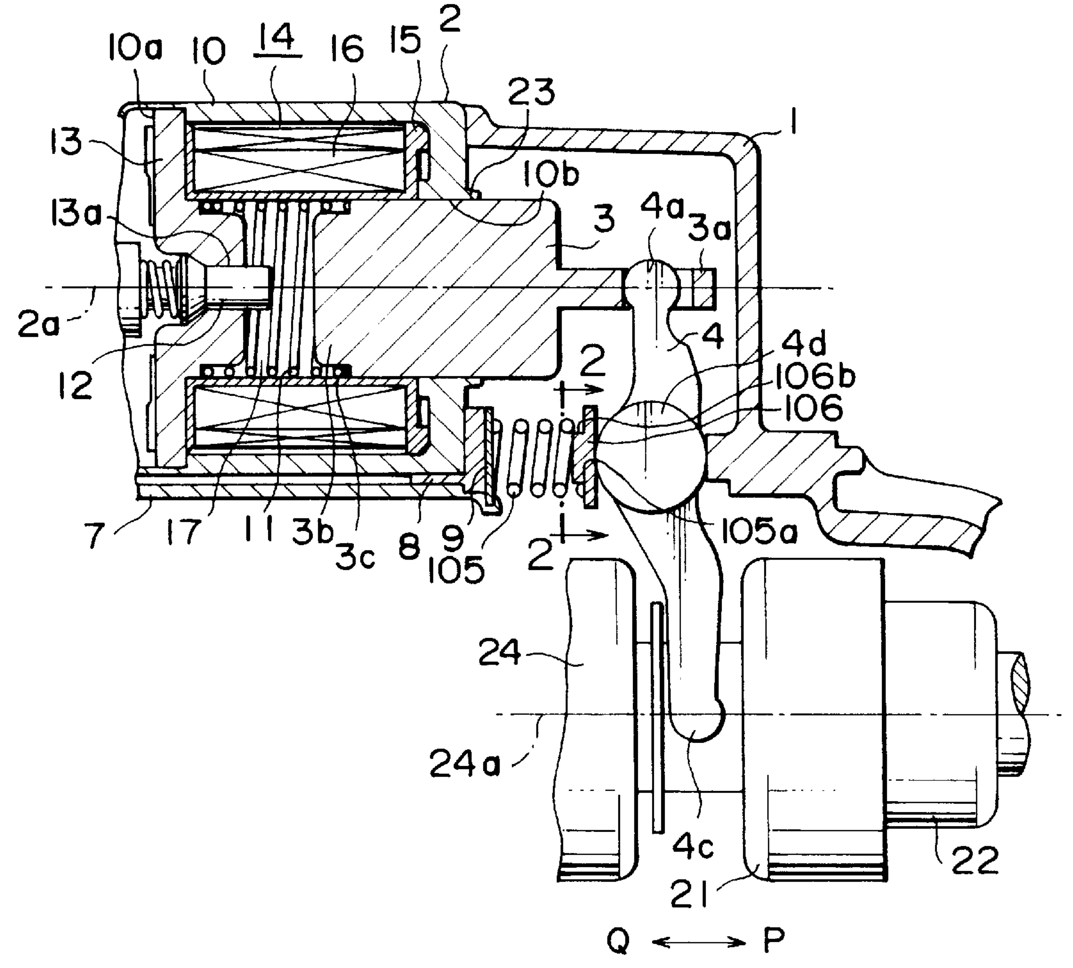
FIG. 1 is a cross-sectional view of a starter which is an embodiment of the present invention.
Figure 2:
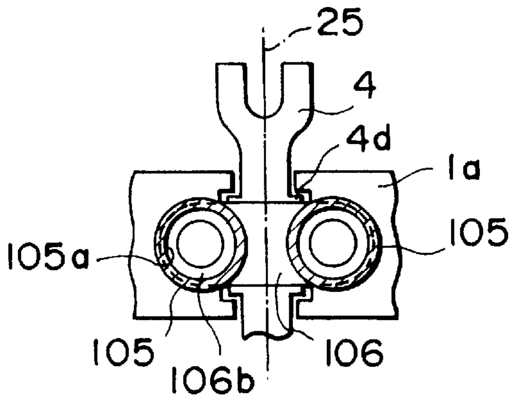
FIG. 2 is a cross-sectional view along line 2—2 in FIG. 1.
Figure 3:
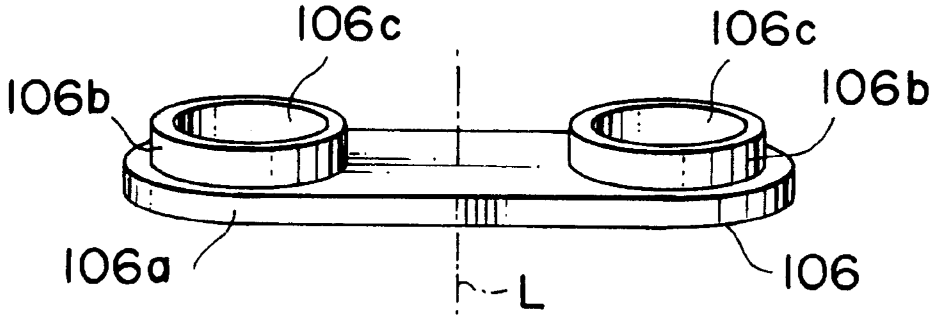
FIG. 3 is a perspective view of a plate which is a component part of the starter which is an embodiment of the present invention.

FIGS. 1 to 4 show a starter which is an embodiment of the present invention. In the figures, parts and portions which are the same as or correspond to those in FIGS. 5 and 6 will be given the same numbers and duplicate explanations will be omitted. FIG. 1 is a cross-sectional view of the starter which is an embodiment of the present invention. FIG. 2 is a cross-sectional view along line 2—2 in FIG. 1. A perspective view of a plate which is a component part of the starter which is an embodiment of the present invention is shown in FIG. 3; and a cross-sectional view thereof in FIG. 4.

Figure 5:
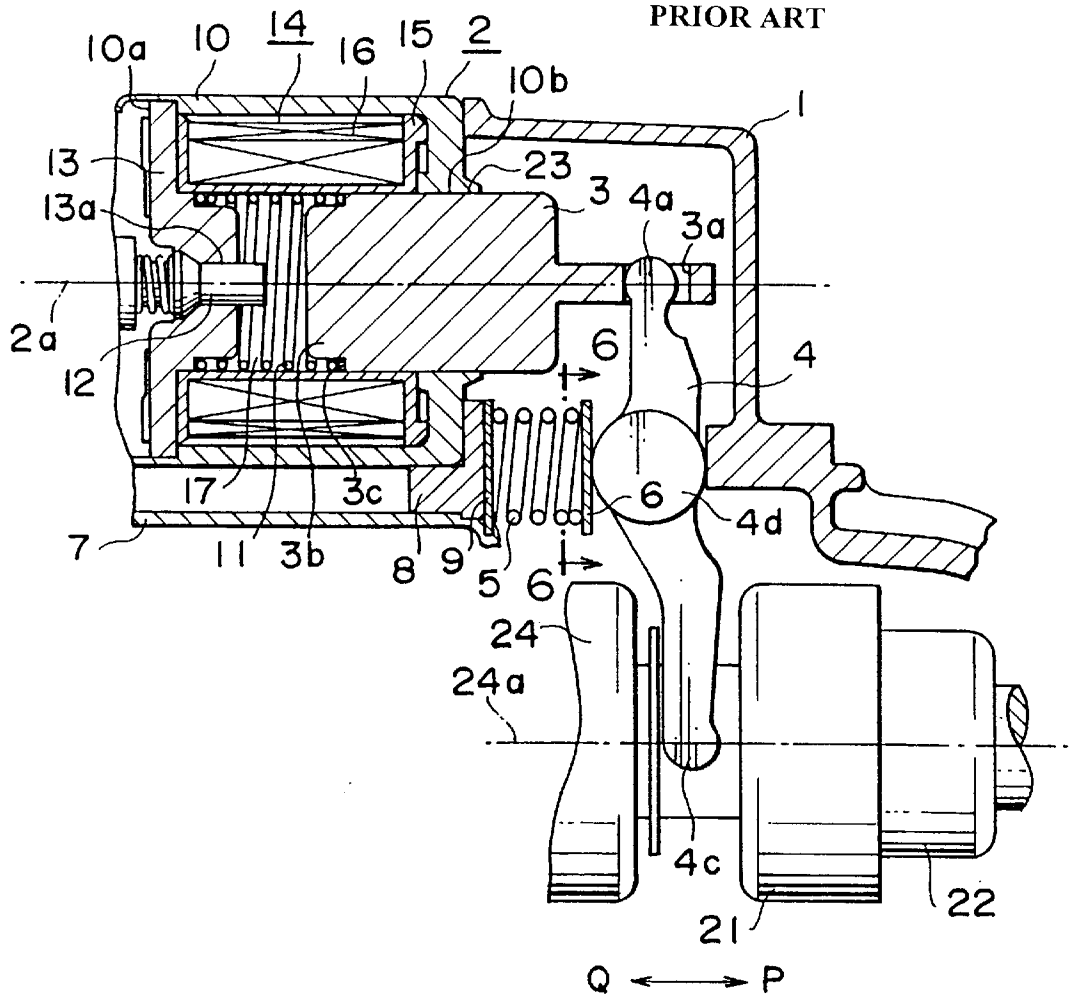
FIG. 5 PRIOR ART
FIG. 5 is a cross-sectional view showing the construction of a conventional starter.
Figure 6:
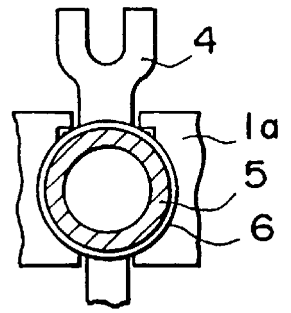
FIG. 6 PRIOR ART
FIG. 6 is a cross-sectional view along line 6—6 in FIG. 5.

FIG. 1 differs from FIG. 5 in the shape, number and position of the lever springs 105, and in the shape of the plate 106.

Figure 4:
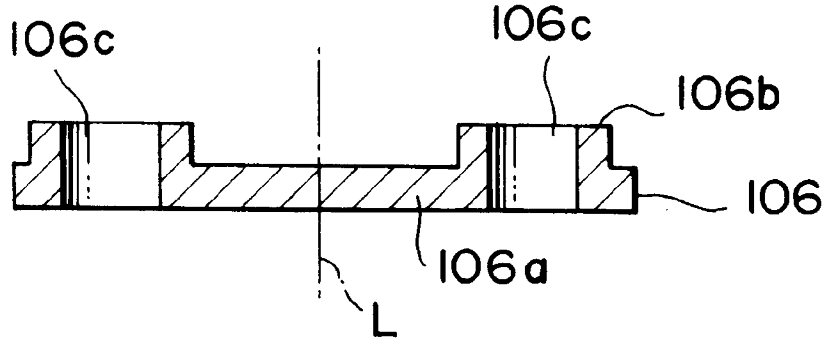
FIG. 4 is a cross-sectional view of the plate which is a component part of the starter which is an embodiment of the present invention.

As shown in FIGS. 3 and 4, the plate 106 comprises: a flat plate portion 106*a,* which is shaped with two straight parallel sides and smooth rounded ends; and two cylindrical portions 106*b,* which form protrusions arranged equidistantly on the flat plate 106*a* from the center line L and cylindrical holes 106*c* which pass through the cylindrical portions 106*b* and the flat plate 106*a* are disposed on the central axis of each of the cylindrical portions 106*b.*

In FIG. 2, the cylindrical portion 4*d* of the shift lever 4 is supported by a support wall 1*a* disposed in the front bracket 1. Two lever springs 105, which are coil springs of smaller outside diameter than the lever spring 5 in FIG. 5, are arranged in symmetrical positions with respect to a plane 25 which includes the central axis 24*a* of the motor 24 and the central axis 2*a* of the electromagnetic switch 2. The shift lever 4 is held between the plate 106 and the front bracket 1 by the elastic force of the two lever springs 205. Consequently, the lever springs 105 and the shift leer 4 come into contact through the plate 106. Also, the inside edges of the ends of the lever springs 105 are attached to the cylindrical portions 106*b* of the plate 106.

In the invention according to this embodiment, the outside diameter of the lever springs 105 is small, and therefore the center distance between the central axis 24*a* of the motor 24 and the central axis 2*a* of the electromagnetic switch 2 can be reduced by partially changing the shape of the grommet 8, the front bracket 1, and the shift lever 4 compared to those in FIG. 5.

Furthermore, the number of cylindrical portions 106*b,* which are protrusions on the plate 106, is not limited to two, and may be three or more, corresponding to the number of lever springs 105.

The present invention comprises: a motor; a clutch, which is connected to the motor; a pinion gear, which is connected to the clutch and engages and disengages with the ring gear of an engine; an electromagnetic switch, which switches on and off an electric current for the motor; a reciprocating shift lever, which is linked to the electromagnetic switch; and lever springs, which press the shift lever so that the pinion gear is elastically pushed against and engaged with the ring gear; wherein the lever springs are arranged symmetrically with respect to a plane which includes the central axis of the motor and the central axis of the electromagnetic switch, so that the size of the starter in the direction is reduced by reducing the center distance between the central axis of the motor and the central axis of the electromagnetic switch without decreasing the load pressing the pinion gear against the ring gear even though the outer diameter of the lever spring is reduced. The mountability of the starter on the engine is also improved thereby.

According to the present invention, the lever springs and the shift lever come into contact through a plate, so that there is no need to enlarge the cylindrical portion of the shift lever to make the cylindrical portion of the shift lever and the lever springs come into direct contact at the positions where the lever springs are arranged.

According to the present invention, the lever springs are attached to a plurality of protrusions on the plate, so that the lever springs and the plate can be assembled as a unit and fitted simultaneously and therefore assembly of the starter is improved.

What is claimed is:

1. A starter comprising:

a motor;

a clutch connected to said motor;

a pinion gear connected to said clutch for engaging and disengaging with a ring gear of an engine;

an electromagnetic switch switching on and off an electric current for said motor;

a reciprocating rocking shift lever linked to said electromagnetic switch;

and lever springs, which press said shift lever so that said pinion gear is elastically pushed against and engaged with said ring gear;

wherein said lever springs are arranged symmetrically with respect to a first plane which includes the central axis of said motor and the central axis of said electromagnetic switch, and are arranged in a second plane which is perpendicular to said first plane and includes a rotating center of shift lever.

2. The starter according to claim 1, wherein said lever springs and said shift lever come into contact through a plate.

3. The starter according to claim 2, wherein said lever springs are attached to a plurality of protrusions on said plate.

4. The starter according to claim 1, wherein said lever springs are attached to a plurality of protrusions on a plate.

* * * * *